(12) United States Patent
Okuyama et al.

(10) Patent No.: US 8,718,637 B2
(45) Date of Patent: May 6, 2014

(54) COMMUNICATION SYSTEM, SERVER EQUIPMENT AND TERMINAL EQUIPMENT

(75) Inventors: Satoshi Okuyama, Kawasaki (JP); Takashi Ohno, Kawasaki (JP); Kenichi Horio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1291 days.

(21) Appl. No.: 12/005,028

(22) Filed: Dec. 21, 2007

(65) Prior Publication Data

US 2008/0176555 A1  Jul. 24, 2008

(30) Foreign Application Priority Data

Jan. 19, 2007  (JP) ................................. 2007-010103

(51) Int. Cl.
*H04W 24/00*  (2009.01)

(52) U.S. Cl.
USPC ........ 455/424; 455/423; 455/425; 455/426.1; 370/270

(58) Field of Classification Search
USPC ......... 455/23–425, 426.1, 518, 521; 370/270, 370/432, 242, 252
See application file for complete search history.

(56) References Cited

U.S. PATENT DOCUMENTS

| | | | |
|---|---|---|---|
| 4,517,561 A * | 5/1985 | Burke et al. ................. | 340/7.21 |
| 5,787,244 A | 7/1998 | Hiratsuka et al. | |
| 7,079,535 B2 * | 7/2006 | Kim .............................. | 370/390 |
| 7,428,422 B2 * | 9/2008 | Hannu et al. ................... | 455/518 |
| 7,630,329 B2 * | 12/2009 | Horio et al. ................... | 370/261 |
| 7,675,875 B2 * | 3/2010 | Lim .............................. | 370/278 |
| 7,751,316 B2 * | 7/2010 | Yarlagadda et al. .......... | 370/230 |
| 2003/0022666 A1 | 1/2003 | Sato | |
| 2004/0184461 A1 | 9/2004 | Forssell et al. | |
| 2005/0094563 A1 | 5/2005 | Takeshita et al. | |
| 2005/0190797 A1 * | 9/2005 | Elliot ............................ | 370/503 |
| 2005/0226193 A1 | 10/2005 | Karhiniemi et al. | |
| 2005/0243722 A1 * | 11/2005 | Liu et al. ....................... | 370/235 |
| 2006/0030344 A1 * | 2/2006 | Lim .............................. | 455/512 |
| 2006/0040689 A1 * | 2/2006 | Yoon et al. .................... | 455/518 |
| 2006/0250995 A1 * | 11/2006 | Lee ............................... | 370/276 |
| 2007/0091889 A1 * | 4/2007 | Xiao et al. .................... | 370/390 |
| 2008/0139232 A1 * | 6/2008 | Santhanam ................... | 455/519 |
| 2010/0040050 A1 * | 2/2010 | Johnston ....................... | 370/352 |

FOREIGN PATENT DOCUMENTS

| | | |
|---|---|---|
| JP | A 11-234273 | 8/1999 |
| JP | A 2003-37599 | 2/2003 |
| JP | 2004-328585 | 11/2004 |

(Continued)

OTHER PUBLICATIONS

Japanese Office Action issued in Japanese App. No. 2007-010103, mailed Apr. 5, 2011.

(Continued)

*Primary Examiner* — Magdi Elhag
(74) *Attorney, Agent, or Firm* — Greer Burns & Crain Ltd.

(57) ABSTRACT

A server equipment forwards received audio data to multiple terminal equipments; judges good or bad of a communication status between the respective terminal equipments; and transmits communication status data indicating good or bad of the communication status to each of the multiple terminal equipments, while a terminal equipment reproduces voice represented by transferred audio data in real-time; receives communication status data transmitted from the server equipment; and notifies a user whether a communication status indicated by the communication status data is good or bad.

8 Claims, 11 Drawing Sheets

(56) References Cited

FOREIGN PATENT DOCUMENTS

| | | |
|---|---|---|
| JP | A 2005-136742 | 5/2005 |
| JP | 2005-244384 | 9/2005 |
| JP | 2006-521046 | 9/2006 |
| WO | WO 03/036889 | 5/2003 |
| WO | WO 2004/075581 | 9/2004 |

OTHER PUBLICATIONS

Japanese Notification of Reasons for Refusal issued in corresponding Japanese Patent Application No. 2007-010103 on Jun. 14, 2011.

* cited by examiner

COMMUNICATION SYSTEM, SERVER EQUIPMENT AND TERMINAL EQUIPMENT

BACKGROUND OF THE INVENTION

1. Field of the Invention

The present invention relates to a communication system that reproduces voice in real-time at plural terminal equipments, a server equipment and terminal equipments that are used in the system.

2. Description of the Related Art

In recent years, a voice multicast system that communicates voice simultaneously and in real-time at many locations has been spreading. Applications of such a voice multicast system include a Push to talk over cellular (PoC) service that enables conversation among three or more cellular phones, and a TV meeting system for having a meeting among people being far away from one another. In a voice multicast system like this, voice can be reproduced simultaneously at multiple terminal equipments by receiving voice originated from one terminal equipment at a server equipment and then by transferring the received voice from the server equipment to other terminal equipments. In addition, voice is transmitted and received by being digitalized and divided into packets per certain data unit. By saving a communication procedure such as an error handling, priority is placed upon real-time communication to reliability of communication. According to a voice multicast system like this, information can be conveyed to one another among multiple people staying at distant locations by saving time and moving costs.

However, in a voice multicast system, there may be situations where the amount of packets processed at a server equipment temporarily increases, for example, in the evening or at New Year's; when a user moves with a cellular phone to a place where a radio wave condition is poor; and when many users use cellular phones in areas covered by one base station and thus band allotment for each cellular phone becomes less. Under such situations the network is not abnormal, yet it makes difficult for the network to conduct packet communication at certain intervals without losing any packet, which hinders reproducing voice in real-time.

There is one known technique to cope with such a problem that a buffer is provided at a terminal equipment and voice is reproduced after accumulating packets transferred from a server at the buffer for a certain period of time in order to absorb delay of packets or fluctuations of delay. In addition, Japanese Patent Application Laid-open No. 2005-136742 describes a technique that changes the amount of data accumulated in a buffer at each terminal equipment and timing of voice reproduction dynamically, in response to situations of packets arriving at the network (server equipment). According to a technique described in Japanese Patent Publication Laid-open No. 2005-136742, even when packets are delayed, voice can be reproduced without causing any discomfort for users.

Moreover, in a voice multicast system in which communication is conducted between many terminal equipments and a server equipment, there is another problem that detecting where on the network a fault occurs is difficult.

Regarding this point, Japanese Patent Application Laid-open No. 2003-37599 describes a technique that detects a fault on the network by a network management device and notifies an administrator of information about the fault. Japanese Patent Application Laid-open No. 11-234273 describes a technique that notifies predetermined multiple administrators of faults on the network.

However, for example, if packets are delayed over several hundreds msecs, or if packet loss occurs in succession, then the technique described in Japanese Patent Application Laid-open No. 2005-136742 cannot absorb them and thus inconveniences arise such as abrupt disconnection of sound or inaudibility of conversation due to too much missing of voice.

Furthermore, although the techniques described in Japanese Patent Application Publication Laid-open Nos. 2003-37599 and 11-234273 can detect communication fault of the network, they cannot detect fault such as the above-described packet loss that is not abnormal on the network. Because of this, a user utilizing each terminal equipment cannot confirm whose terminal equipment is experiencing fault among multiple users who are engaged in conversation, and therefore, there are problems that the user is required to repeat talks or only one person is left out of topics or the like.

SUMMARY OF THE INVENTION

The present invention has been made in view of the above circumstances and provides a communication system that is capable of avoiding repetition of talks and missing of topics, etc. and is capable of reproducing voice in real-time at multiple terminal equipments, a server equipment and terminal equipments used in the system.

A communication system according to the present invention that includes a plurality of terminal equipments and a server equipment, transmits audio data representing voice from one of the plurality of the terminal equipments, transfers the audio data to other terminal equipments at the server equipment and reproduces the voice in real-time at the other terminal equipments, the server equipment includes:

an audio data receiving section that receives audio data transmitted from the terminal equipments;

an audio data transfer section that transfers the audio data received at the audio data receiving section to each of the other terminal equipments excepting an originating terminal equipment that has originated the audio data;

a communication status judging section that judges good or bad of a communication status between respective terminal equipments of the plurality of terminal equipments; and a communication status data transmitting section that transmits communication status data indicating the good or bad of the communication status judged at the communication status judging section, to each of the plurality of terminal equipments, each of the terminal equipments includes:

an audio data transmitting section that transmits the audio data;

a transferred audio data receiving section that receives audio data transferred from the server equipment;

an audio reproduction section that reproduces in real-time a voice represented by the audio data received at the transferred audio data receiving section;

a communication status data receiving section that receives communication status data transmitted from the server equipment; and a communication status notifying section that notifies a user of the good or bad of a communication status indicated by the communication status data.

According to the communication system of the present invention, at the server equipment, good or bad of a communication status between respective terminal equipments is judged and the judged result is conveyed to each of the multiple terminal equipments and to the user. Therefore, the user can confirm whether the voice the user has issued is conveyed to other users and whether the voice issued by other user is conveyed to the user.

Further, in the communication system according to the present invention, it is desirable that the communication status notifying section displays a communication status indicated by the communication status data on a given display screen.

In a voice multicast system that reproduces the same voice simultaneously at multiple terminal equipments, cellular phones and video phones are utilized as a terminal equipment and a display screen is provided in general. By displaying good or bad of a communication status on the display screen, the user can confirm a conveying status of voice.

Furthermore, in the communication system according to the present invention, each of the terminal equipments may further include:

a fault detecting section that detects a fault in communication between the server equipment and the terminal equipment; and a fault notifying section that notifies the server equipment that a fault is detected if a fault is detected at the fault detecting section, and the communication status judging section of the server equipment judges that a communication status is bad for a terminal equipment having notified that the fault has been detected.

By including the fault detecting section in the terminal equipment, it is possible to certainly notify the user of a fault on the network, in addition to abnormal data reception or timeout and the like.

Moreover, in the communication system according to the present invention, each of the terminal equipments preferably includes a response data transmitting section that repeatedly transmits response data indicating that a communication status is normal to the server equipment, and the server equipment further preferably includes a response data receiving section that receives the response data from each of the terminal equipments, and the communication status judging section of the server equipment judges that a communication status is bad for a terminal equipment from which the server equipment fails to receive the response data.

By confirming at the server equipment, reception or non-reception of response data transmitted repeatedly from each of the multiple terminal equipments, it is possible to certainly judge a communication status between respective terminal equipments at the server equipment.

Moreover, in the communication system according to the present invention, each of the terminal equipments preferably includes:

a fault detecting section that detects a fault that the audio data transmitting section has failed in transmitting audio data; and a fault notifying section that notifies the server equipment that a fault is detected if a fault is detected at the fault detecting section, and the communication status judging section of the server equipment judges that a communication status is bad for a terminal equipment having notified that the fault has been detected.

By notifying an error in issuing audio data to the server equipment, a failure in issuing voice is also notified to users of the terminal equipments other than the originating terminal equipment. Thus, it is possible to avoid losing conversation in midstream.

Furthermore, in the communication system according to the present invention, it is desirable that each of the terminal equipments further includes an audio data retransmitting section that, if communication status data indicating a bad communication status is received at the communication status data receiving section after audio data has been transmitted from the audio data transmitting section, retransmits the audio data.

As audio data is retransmitted, it is possible to certainly prevent conversation from being lost in midstream, by saving the labor of repeating the same talk.

Moreover, in the communication system according to the present invention, it is preferable that the communication system is capable of communicating both in a first communication method and in a second communication method, the second communication method being relatively slow in communication speed and relatively superior in reliability of communication compared with the first communication method, the audio data transmitting section and the transferred audio data receiving section of the terminal equipment communicate audio data based on the first communication method, and each of the terminal equipments further includes an audio data retransmitting section that, if communication status data indicating a bad communication status is received at the communication status data receiving section after audio data has been transmitted from the audio data transmitting section, retransmits the audio data based on the second communication method.

As voice is usually communicated in the first communication method that is relatively fast, and in a case where a communication status is poor, voice is communicated in the second communication method that is relatively superior in reliability of communication. Thus, it is possible to achieve real-time voice reproduction and reliability of voice reproduction.

Additionally, in the communication system according to the present invention, it is desirable that the server equipment further includes:

a received data storing section that stores audio data received at the audio data receiving section; and a retransfer conducting section that, if at the communication status judging section, a communication status is judged bad for a terminal equipment among the plurality of terminal equipments excepting the originating terminal equipment, retransfers audio data stored in the received data storing section to the terminal equipment.

As audio data stored in the server equipment is retransferred if the communication status of the terminal equipment to which the audio data has been transferred is bad, it is possible to save the labor and time for retransmitting the audio data from the originating terminal equipment to the server equipment. Thus, speedy processing can be enabled.

Also, in the communication system according to the present invention, it is preferable that the communication system is capable of communicating both in a first communication method and in a second communication method, the second communication method being relatively slow in communication speed and relatively superior in reliability of communication compared with the first communication method, the audio data receiving section and the audio data transfer section of the server equipment receive audio data based on the first communication method, and the server equipment further includes:

a received data storing section that stores audio data received at the audio data receiving section; and a retransfer conducting section that, if at the communication status judging section, a communication status is judged bad for a terminal equipment among the plurality of terminal equipments excepting the originating terminal equipment, retransfers audio data stored in the received data storing section to the terminal equipment, based on the second communication method.

As audio data stored in the server equipment is retransferred in the second communication method if the communication status is bad, it is possible to save the labor and time for retransferring the audio data from the originating terminal equipment to the server equipment and retransfer the audio data surely as well.

In addition, in the communication system according to the present invention, it is preferable that the audio data is a series of delimited data that is delimited per certain timing, and each of the terminal equipments further includes:

a list receiving section that receives a list of the delimited data; and a list displaying section that displays the list of delimited data received at the list receiving section; and an audio data designating section that designates one delimited data in the list displayed at the list displaying section according to an operation, and the server equipment further includes:

a received data storing section that stores audio data received at the audio data receiving section, for each of the delimited data;

a list transmitting section that transmits a list of the delimited data stored in the received data storing section; and a retransfer conducting section that retransfers the designated delimited data, upon the receipt of designation of one delimited data in the list.

By retransferring only the delimited data designated by the user, it is possible to suppress the amount of communication data and reduce processing time accordingly.

Moreover, in the communication system according to the present invention, it is preferable that each of the terminal equipments further includes a reproducing status notifying section that notifies the server equipment of a reproducing status of the audio data, and the communication status judging section of the server equipment judges among the plurality of terminal equipments, that a communication status is bad for a terminal equipment that has notified that reproduction is unfinished and a terminal equipment that has failed to notify the reproducing status.

According to this preferable communication system, it is possible to certainly obtain a reproducing status at each of the terminal equipments at the server equipment, and each user of the multiple terminal equipments can be notified which user has not finished listening to the voice.

Moreover, in the communication system according to the present invention, it is preferable that each of the terminal equipments further includes a reproducing status notifying section that notifies the server equipment of a reproducing status of the audio data, the communication status judging section of the server equipment judges among the plurality of terminal equipments, that a communication status is bad for a terminal equipment that has notified that reproduction is unfinished and a terminal equipment that has failed to notify the reproducing status, and the server equipment further includes a transmission prohibiting section that, if there is a terminal equipment whose communication status is judged bad at the communication status judging section, prohibits a transmission of audio data to other terminal equipments excepting the terminal equipment that is judged bad, until reproduction of the audio data finishes at the terminal equipment.

By prohibiting transmission of next voice until the user of the terminal equipment whose communication status is bad finishes listening to all the voice, it is possible to avoid accumulating voice that has not been reproduced, and eventually, avoid leaving the user behind the conversation.

Furthermore, a server equipment according to another aspect of the present invention being used in a communication system that includes a plurality of terminal equipments and a server equipment, transmits audio data representing voice from one of the plurality of terminal equipments, transfers the audio data to other terminal equipments at the server equipment, and reproduces the voice in real-time at the other terminal equipments, the server equipment includes:

an audio data receiving section that receives audio data transmitted from the terminal equipments;

an audio data transfer section that transfers the audio data received at the audio data receiving section to each of the other terminal equipments among the plurality of terminal equipments, excepting an originating terminal equipment that has originated the audio data;

a communication status judging section that judges good or bad of a communication status between respective terminal equipments of the plurality of terminal equipments; and a communication status data transmitting section that transmits communication status data indicating good or bad of the communication status judged at the communication status judging section, to each of the plurality of terminal equipments.

According to the server equipment of the present invention, as a communication status data is transmitted to each of the multiple terminal equipments, it is possible to certainly notify each user of the multiple terminal equipments whether a communication status is good or bad.

Additionally, here, only a basic embodiment has been described about the server equipment. However, this is simply to avoid redundancy, and the server equipment according to the present invention includes not only the above-described basic embodiment, but also various types of embodiments corresponding to each of the embodiments of the communication system previously described.

Moreover, a terminal equipment according to another aspect of the present invention being used in a communication system that includes a plurality of terminal equipments and a server equipment, transmits audio data representing voice from one of the plurality of terminal equipments, transfers the audio data to other terminal equipments at the server equipment, and reproduces the voice in real-time at the other terminal equipments, the terminal equipment includes:

an audio data transmitting section that transmits audio data representing voice;

a transferred audio data receiving section that receives audio data that has been originated from other terminal equipment and transferred from the server equipment;

an audio reproduction section that reproduces in real-time voice represented by audio data received at the transferred audio data receiving section;

a communication status data receiving section that receives communication status data that is transmitted from the server equipment and that indicates good or bad of a communication status between each of the terminal equipments and the server equipment; and a communication status notifying section that notifies a user of the good or bad of a communication status indicated by the communication status data.

According to the terminal equipment of the present invention, as the user is certainly notified whether a communication status is good or bad, it is possible to avoid such fault as one that some users are left behind conversation.

With respect to the terminal equipment, only a basic embodiment has been described here. However, this is simply to avoid redundancy, and the terminal equipment according to the present invention includes not only the above-described basic embodiment, but also various types of embodiments corresponding to each of the embodiments of the communication system previously described.

According to the present invention, it is possible to avoid repeating talks and missing of topics and the like, and voice can be surely reproduced in real-time or nearly real-time at multiple terminal equipments.

DETAILED DESCRIPTION OF THE INVENTION

The embodiments of the present invention will be described below with reference to the accompanying drawings.

Figure 1:
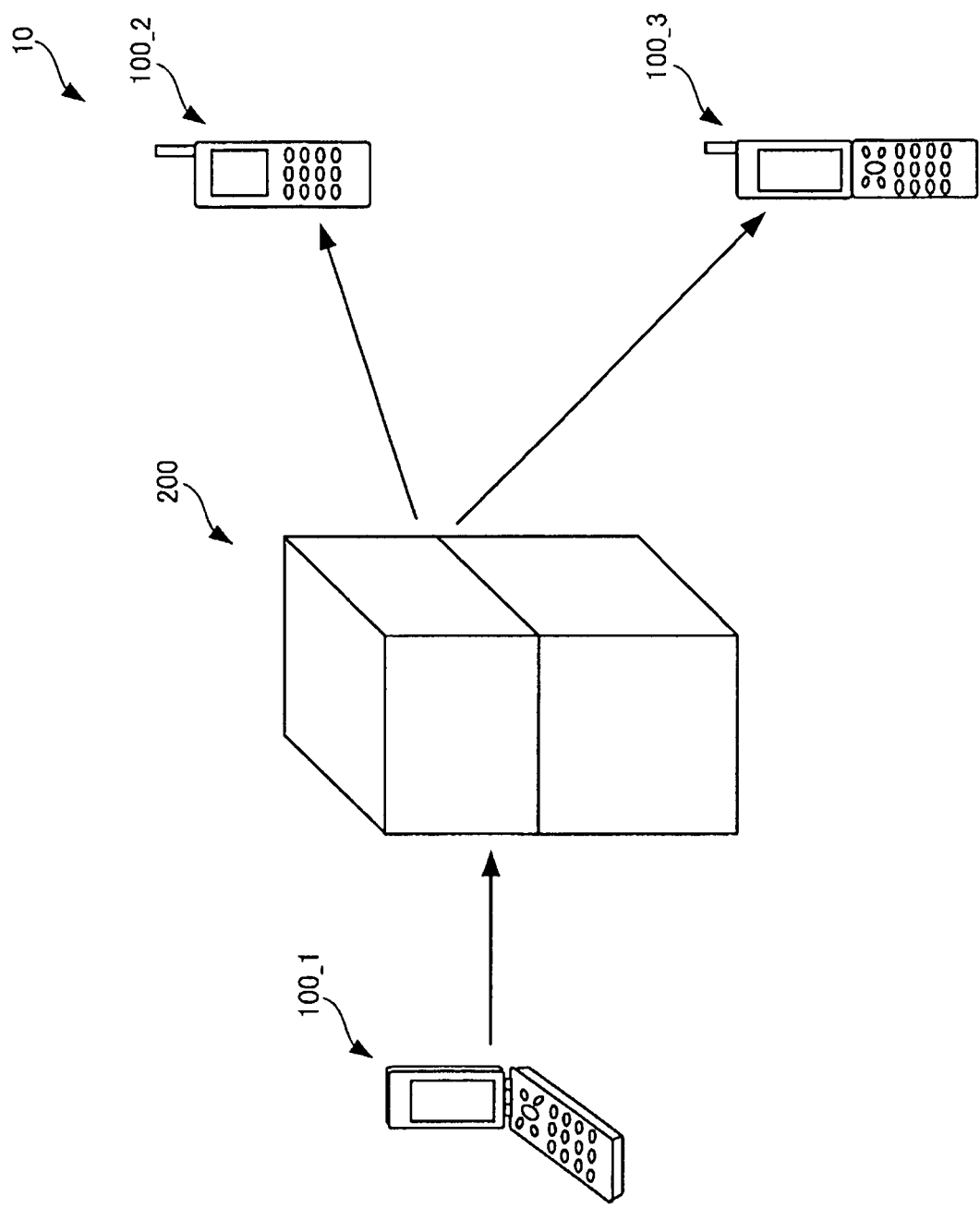
FIG. 1 is a schematic diagram illustrating one example of a voice multicast system to which one embodiment of the communication system of the present invention is applied.

FIG. 1 is a schematic diagram illustrating one example of a voice multicast system in which one embodiment of the communication system of the present invention is applied.

FIG. 1 shows cellular phones 100_1, 100_2 and 100_3, and a base station 200 for conducting wireless communication between the cellular phones 100_1, 100_2 and 100_3. Actually, many cellular phones are connected to the base station 200, and furthermore, many base stations and Internet lines are connected to one another. Yet for the simplicity of drawing, FIG. 1 illustrates only the minimum necessary for the explanation of the present invention.

The cellular phones 100_1, 100_2 and 100_3 are provided with ordinary communication functions that conducts such as one-to-one phone conversation and transmission/reception of emails via the base station 200; a voice multicast function that reproduces voice simultaneously at the cellular phones 100_1, 100_2 and 100_3 via the base station 200 by utilizing a PoC service; and a short distance communication function that conducts direct communication to one another among the cellular phones 100_1, 100_2 and 100_3 by using infrared rays. If any user of the cellular phones 100_1, 100_2, or 100_3 specifies a cellular phone to conduct a voice multicast through a phonebook or the like, then a request for participation in the voice multicast is conveyed to cellular phones specified by the server equipment within the base station 200, and the cellular phones the user has selected to give a permission join the voice multicast communication. If each user issues an instruction for obtaining a speaker right, the speaker right is given to one of the cellular phones from which the server equipment within the base station 200 has received instructions for obtaining the speaker right, and voice is issued from the cellular phone having the speaker right. The issued voice is transferred by the server equipment within the base station 200 to other cellular phones and is reproduced. Furthermore, as the speaker right is controlled by the base station 200, it is possible to have a conversation in real-time by using multiple cellular phones. A more detailed explanation of the voice multicast function will be given later.

Next, the cellular phones 100_1, 100_2 and 100_3 will be explained. Since these three cellular phones 100_1, 100_2 and 100_3 have almost the same configuration and functions, the explanation is given for one cellular phone 100_1 on behalf of these three cellular phones 100_1, 100_2 and 100_3.

Figure 2:
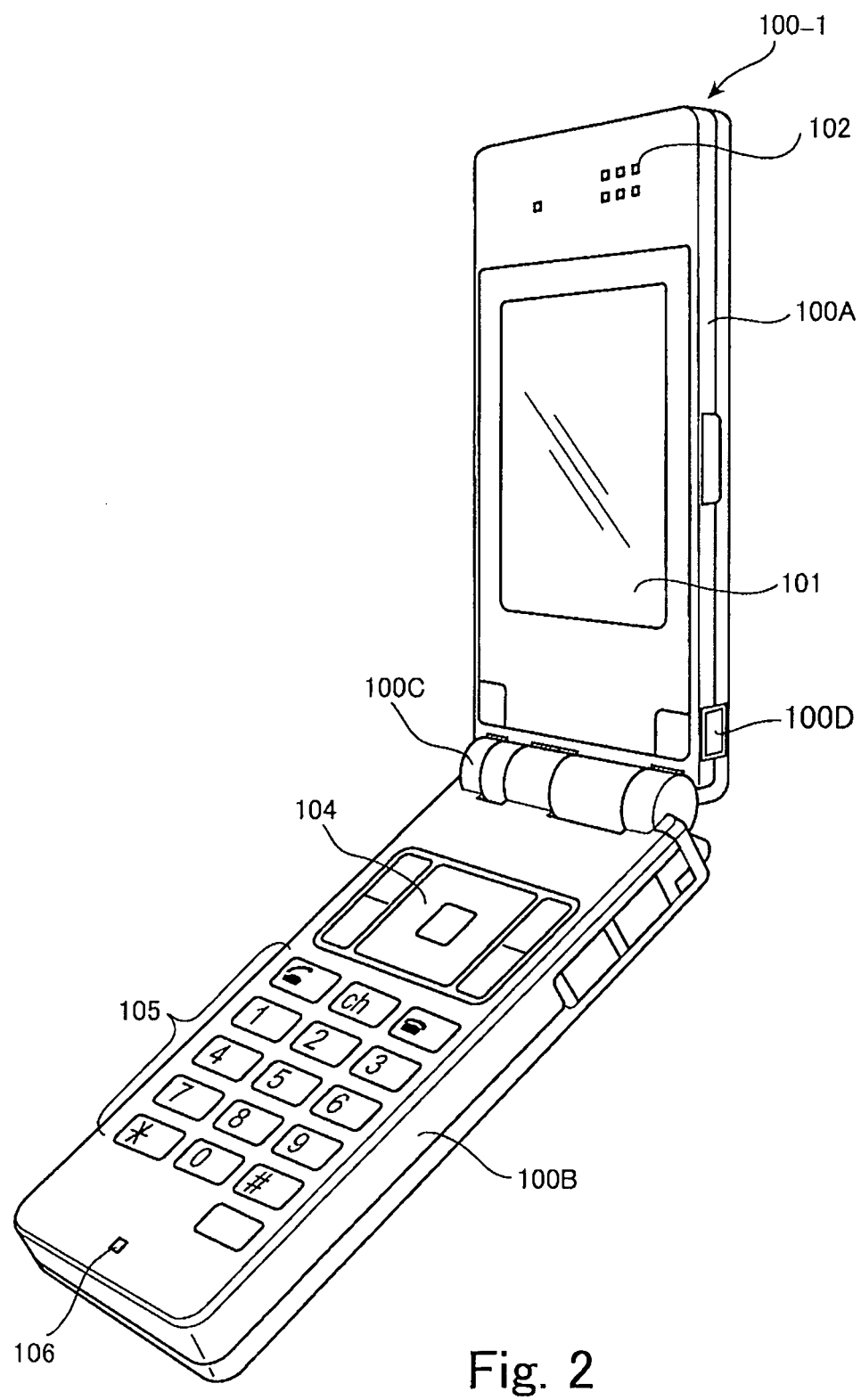
FIG. 2 is a perspective external view of a cellular phone.

FIG. 2 is a perspective view showing the outlook of the cellular phone 100_1.

The cellular phone 100_1 shown in FIG. 2 is provided with an upper case 100A which a user presses on the ear during a phone call and a lower case 100B which the user holds by hand. The upper case 100A and the lower case 100B are connected to be foldable around a hinge section 100C.

On the upper case 100A, an LCD panel 101 is provided for displaying a menu screen and a shot image; a speaker is disposed internally (see FIG. 2); an earpiece 102 is provided for outputting a voice coming from the speaker; and on the side of the upper case 100A, a speaker switch 100D is to be pressed at the time of issuing a voice by using the above-described voice multicast function.

Furthermore, on the lower case 100B, there are a selection button 104 used as a button for selecting various functions and also as a shutter button to take a picture; a push button 105 for entering telephone numbers or the like; a microphone (see FIG. 2) disposed inside the case; and a mouthpiece 106 for conveying voice to the microphone.

Next, the internal structure of the cellular phone 100_1 will be explained.

Figure 3:
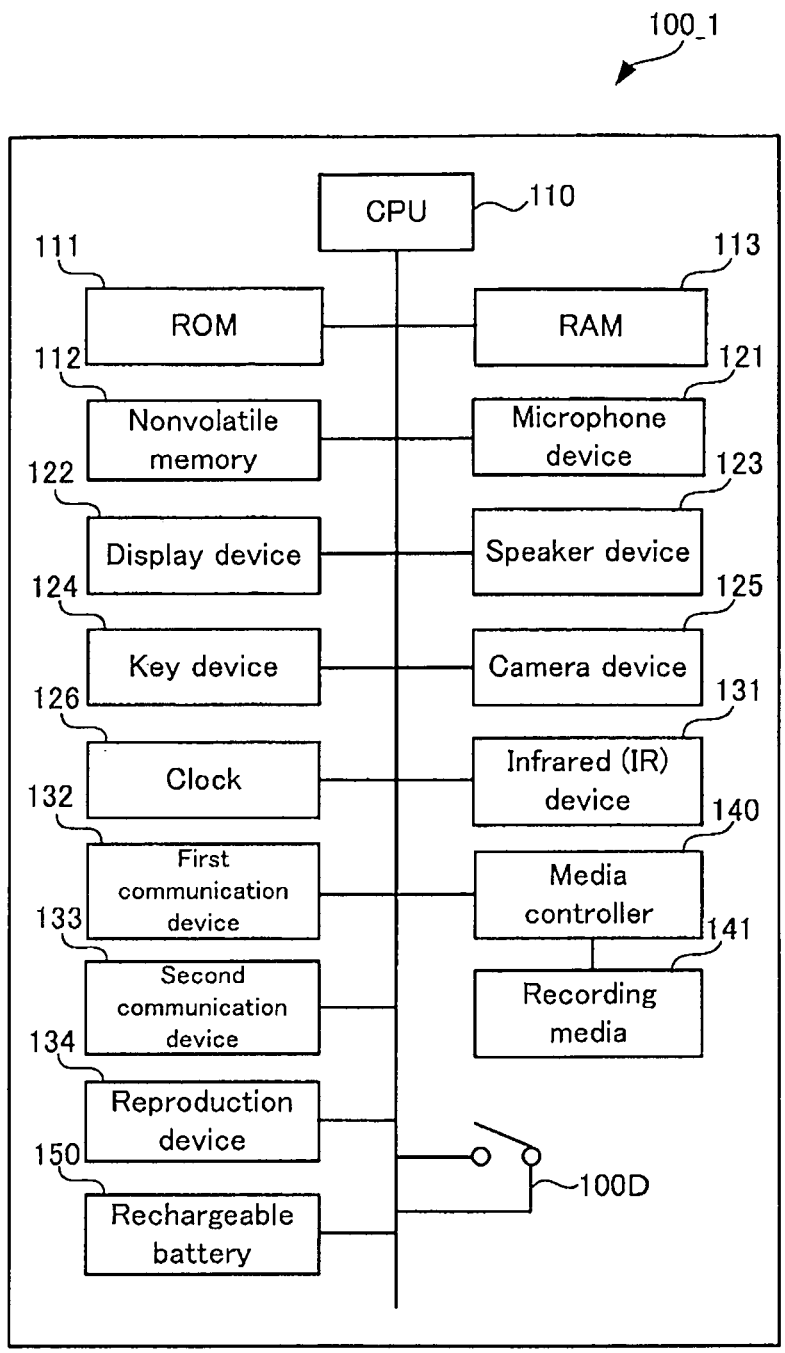
FIG. 3 is an internal block diagram of the cellular phone.

FIG. 3 is an internal block diagram of the cellular phone 100_1.

FIG. 3 shows a CPU 110, a ROM 111, a nonvolatile memory 112, a RAM 113, a microphone device 121, a display device 122, a speaker device 123, a key device 124, a camera device 125, a clock 126, an infrared device 131, a first communication device 132, a second communication device 133, a reproduction device 134, a media controller 140 and a rechargeable battery 150. These are connected to one another via a bus.

The CPU 110 has a function to execute various kinds of programs and controls the overall of this cellular phone 100_1.

The ROM 111 stores various kinds of programs executed at the CPU 110 and various kinds of constants required for executing these various kinds of programs. The CPU 110 executes programs memorized in the ROM 111 by using the RAM 113 as a work area.

The nonvolatile memory 112 records various kinds of information such as an address book and received emails that may be rewritten.

The microphone device 121 is a microphone for picking up user's voice and a functional block for processing the voice picked up by the microphone.

The speaker device 123 is a speaker that outputs voice to a user and a functional block for generating a voice signal to drive the speaker.

The camera device 125 is a block for handling collection of image data by picture taking. The display device 122 is a block for handling image display on the LCD panel 101 (see FIG. 2). The key device 124 is a block for detecting various kinds of key operations by a user, and the clock 126 is a block for acquiring the current time.

The media controller 140 is for reading data from an attached recording media 141 and for writing image data or the like generated in the camera device 125 into the recording media 141.

The infrared device 131 transmits images and phone numbers or the like to an external device placed in a short distance from the infrared device using infrared communication without involving a base station.

Additionally, the first communication device 132 works to realize communication functions such as making phone calls and exchanging emails via the base station 200 shown in FIG. 1, and adopts a highly reliable communication method in which a retransmitting processing is arranged in the event of errors (TCP/IP in the present embodiment).

The second communication device 133 works to realize a voice multicast function that reproduces voice simultaneously at these cellular phones 100_1, 100_2 and 100_3. Basically audio data is communicated by a high-speed communication method realizing fast processing by omitting a retransmission procedure in the event of errors (UDP in the present embodiment). However, in the event of errors or the like, various kinds of data is communicated by the above-described highly reliable communication method.

Here, it should be noted that functions of the first communication device 132 and the second communication device 133 are capable of being realized also by software.

Basically, the cellular phone 100_1 is constructed in such a way as described above.

Next, voice multicast processing in the voice multicast system shown in FIG. 1 will be explained.

Figure 4:
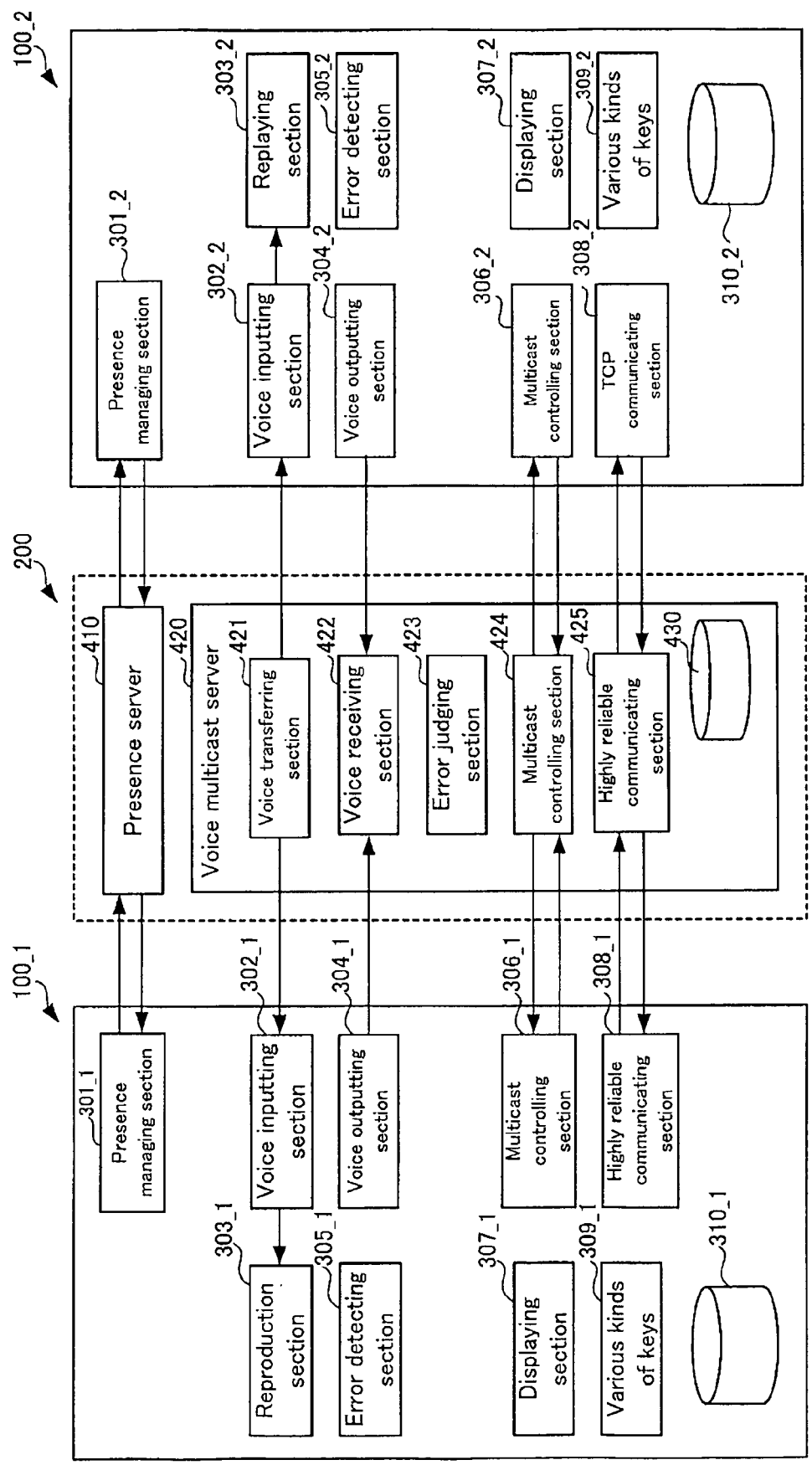
FIG. 4 is a functional block diagram of various elements for voice multicast processing in the cellular phone and a base station constituting part of the voice multicast system shown in FIG. 1.

FIG. 4 is a functional block diagram of various kinds of elements regarding voice multicast processing in a cellular phone and a base station that constitute part of the voice multicast system shown in FIG. 1.

FIG. 4 shows three cellular phones 100_1, 100_2 and 100_3. In reality, voice is issued from each of multiple cellular phones including these three cellular phones 100_1, 100_2 and 100_3. However, in the following, only two cellular phones 100_1 and 100_2 are shown, and an explanation will be made by assuming that voice is issued from the cellular phone 100_1. Also, in these two cellular phones 100_1 and 100_2, the same numbers are used for the same elements, and each element of these two cellular phones 100_1 and 100_2 is distinguished by its last digit number.

As shown in FIG. 4, the base station 200 includes a presence server 410 that obtains a participation status for voice multicast communication of each of the multiple cellular phones and that controls starting and ending of multicast and a speaker right; and a voice multicast server 420 that controls voice multicast processing. The voice multicast server 420 includes a voice receiving section 422 that receives voice originated from a cellular phone; a voice transferring section 421 that transfers received voice; an error judging section 423 that judges whether a communication status is good or bad by loss or delay of voice or the like; a multicast controlling section 424 that transmits and receives response data between cellular phones (ACK data if normal, NACK data if abnormal) and controls voice multicast processing; a highly reliable communicating section 425 that conducts retransmission of voice; and a storing section 430 that stores received voice. At the presence server 410, TCP/IP as a highly reliable communication method is adopted, whereas at the voice receiving section 422 and the voice transferring section 421, UDP as a high-speed communication method is adopted. In addition, at the presence server 410, UDP as a high-speed communication method may be adopted, instead of TCP/IP as a highly reliable communication method. The voice receiving section 422 corresponds to one example of the audio data receiving section according to the present invention, and the voice transferring section 421 corresponds to one example of the audio data transfer section according to the present invention. Moreover, the error judging section 423 corresponds to one example of the communication status judging section according to the present invention; the highly reliable communication method 425 corresponds to one example of the retransmission conducting section; and the presence server 410 corresponds to one example of the communication status data transferring section according to the present invention. Furthermore, the multicast controlling section 424 corresponds to one example of the response data receiving section according to the present invention, and the storing section 430 corresponds to one example of receiving data storing section according to the present invention.

The cellular phone 100_1 includes a presence managing section 301_1 that conveys, to the presence server 410, starting and ending of multicast, addition of members, a request for obtaining a speaker right and a request for canceling the speaker right; a voice outputting section 304_1 that issues voice entered from the microphone device 121 shown in FIG. 3 to the voice multicast server 420; a voice inputting section 302_1 that receives voice transferred from the voice multicast server 420; a reproduction section 303_1 that reproduces received voice, which is conducted by the reproduction device 134 shown in FIG. 3; a multicast controlling section 306_1 that transfers/receives response data (ACK data if normal, NACK data if abnormal) between the voice multicast server 420 and an error detecting section 305_1 that detects an error such as delay of data, and controls voice multicast processing; a displaying section 307_1 that displays a communication status or the like at other cellular phones on the LCD panel 101 shown in FIG. 1, which is conducted by the display device 122 shown in FIG. 3; a highly reliable communicating section 308_1 that communicates retransferred audio data or the like; various kinds of keys 309_1 that the user uses for inputting instructions; and a storing section 310_1 that stores issued voice. In addition, also the cellular phone 100_2 and other cellular phones are equipped with the same elements as the cellular phone 100_1. The voice outputting section 304_1 corresponds to one example of the audio data transmitting section according to the present invention; the voice inputting section 302_1 corresponds to one example of the transferred audio data receiving section in the present invention; and the reproduction section 303_1 corresponds to one example of the voice reproduction section according to the present invention. Moreover, the displaying section 307_1 corresponds to one example of the communication status notifying section according to the present invention; the presence managing section 301_1 corresponds to one example of the communication status data receiving section according to the present invention; and the highly reliable communicating section 308_1 corresponds to one example of the audio data retransmitting section according to the present invention. Furthermore, the error detecting section 305_1 corresponds to one example of the fault detecting section according to the present invention; and the multicast controlling section 306_1 corresponds to one example of the response data transmitting section according to the present invention.

Figure 5:
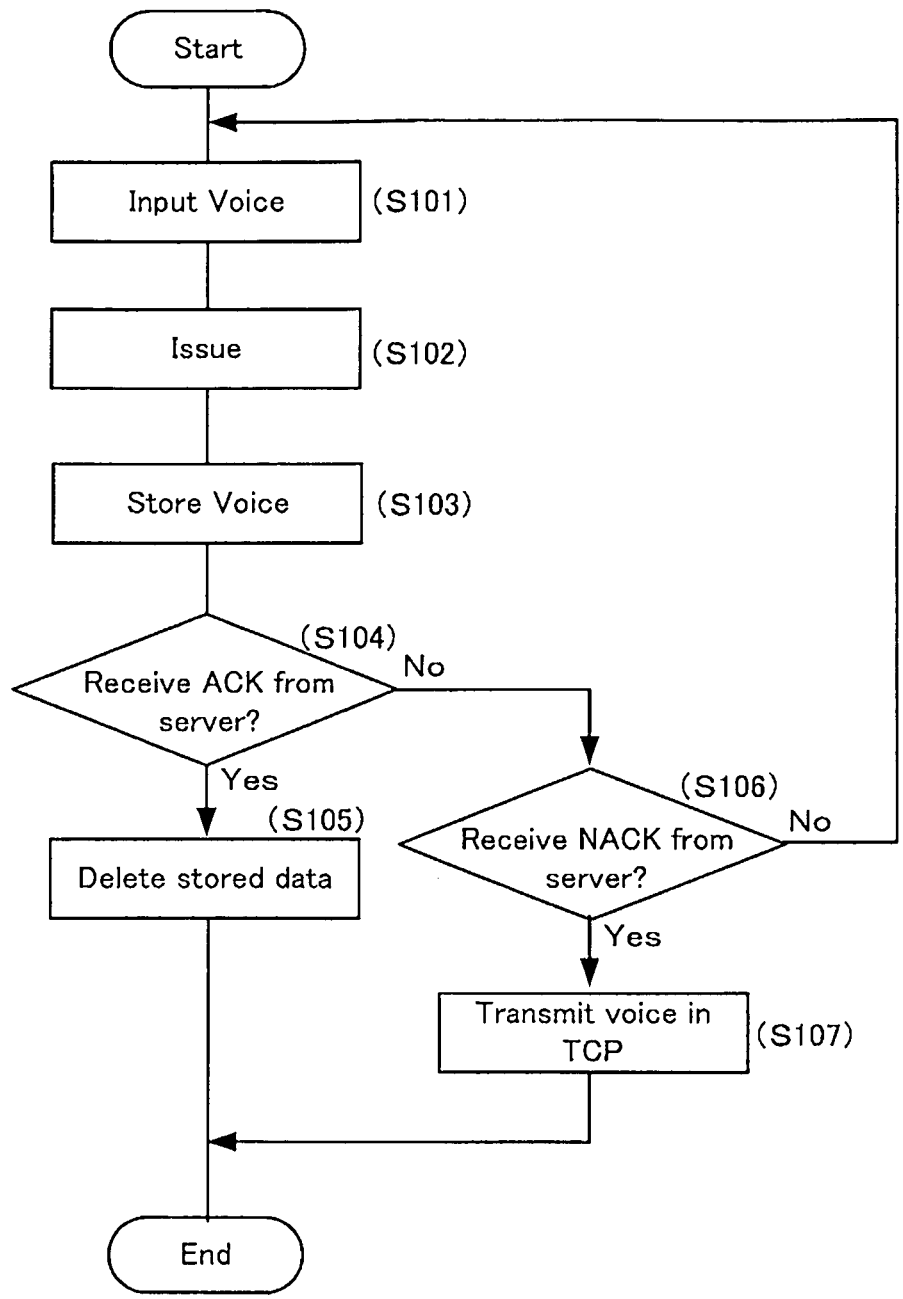
FIG. 5 is a flowchart illustrating a series of processing at the cellular phone as a voice originating side.
Figure 6:
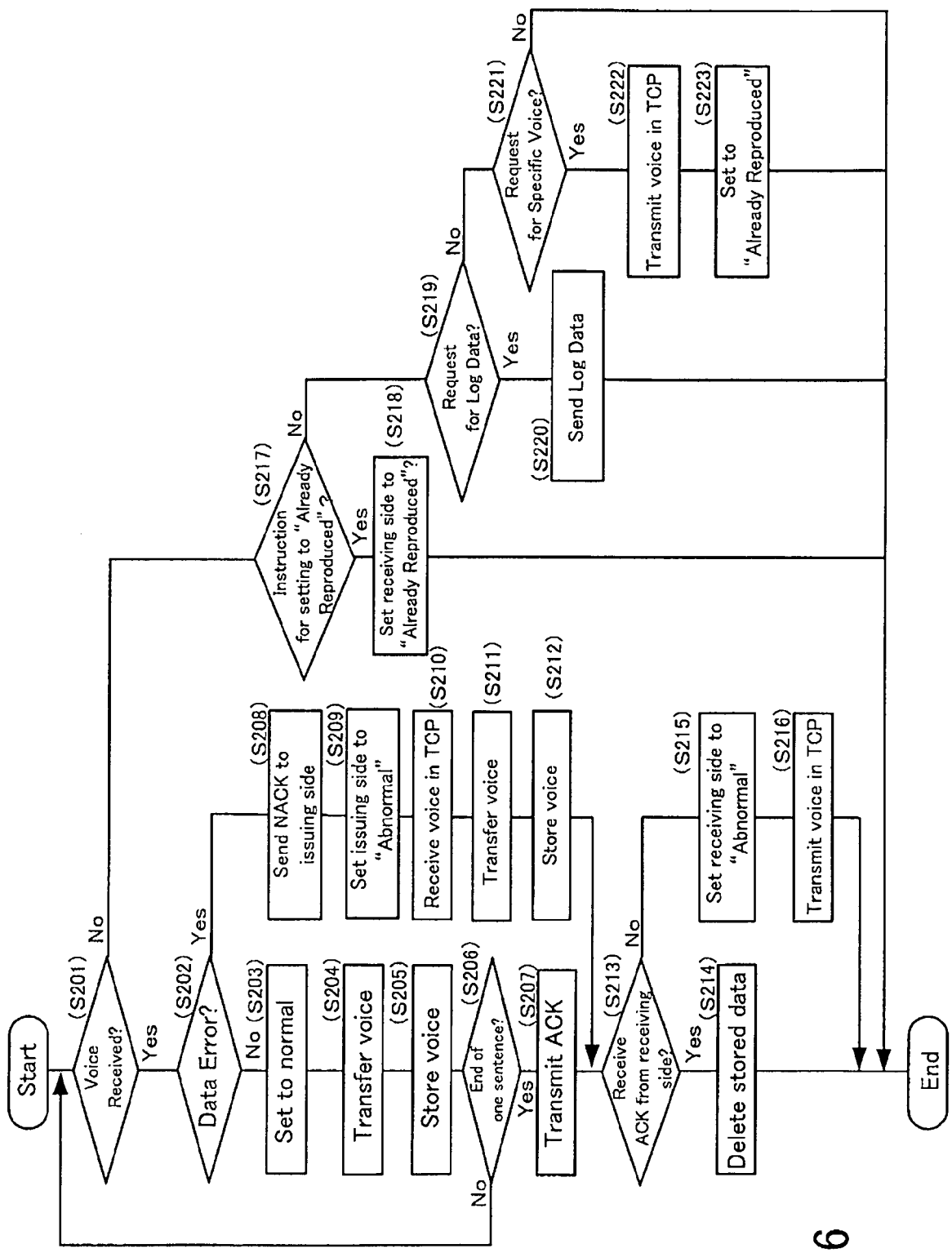
FIG. 6 is a flowchart illustrating a series of processing at a voice multicast server.
Figure 7:
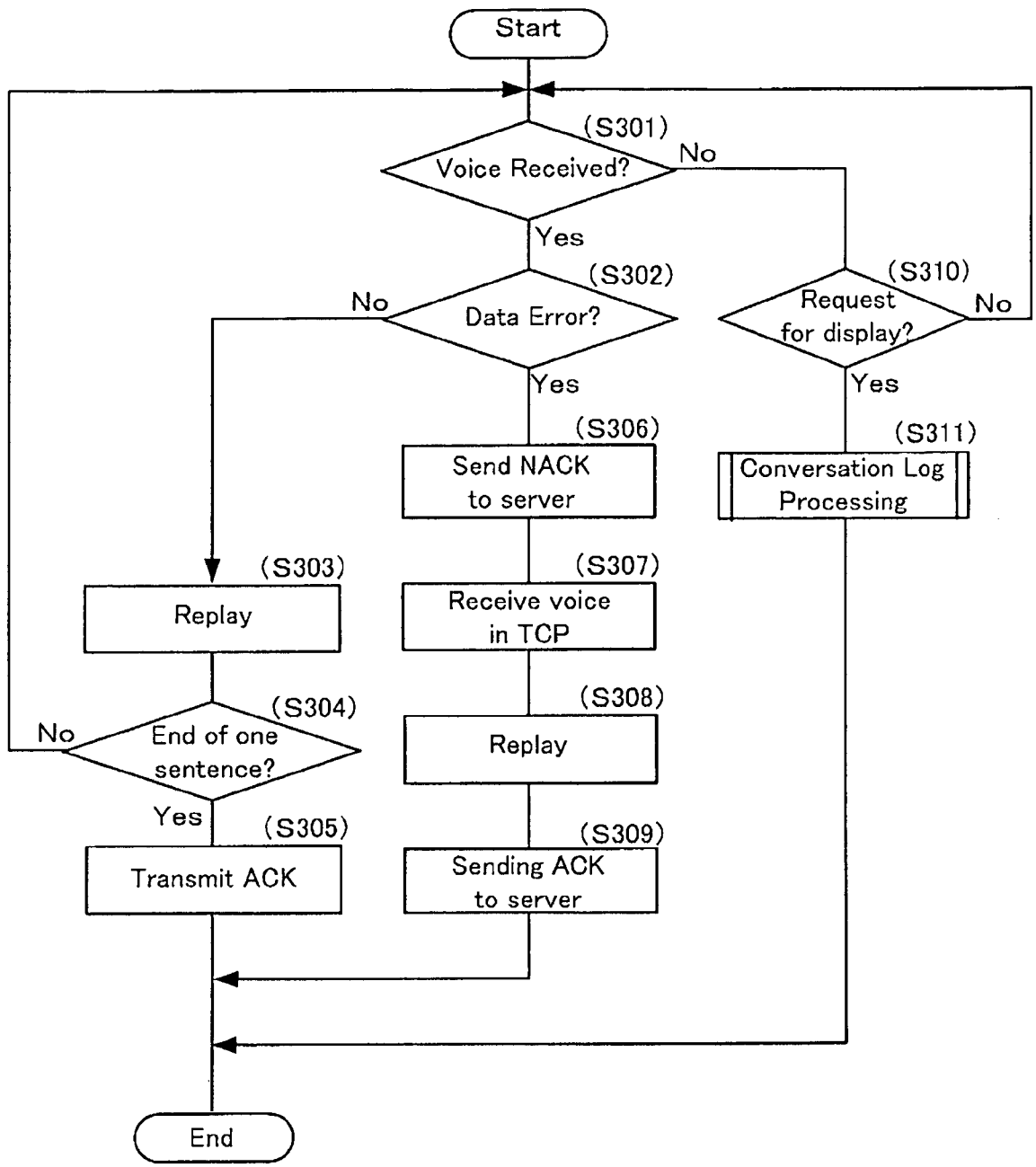
FIG. 7 is a flowchart illustrating a series of processing at the cellular phone as a voice receiving side.
Figure 8:
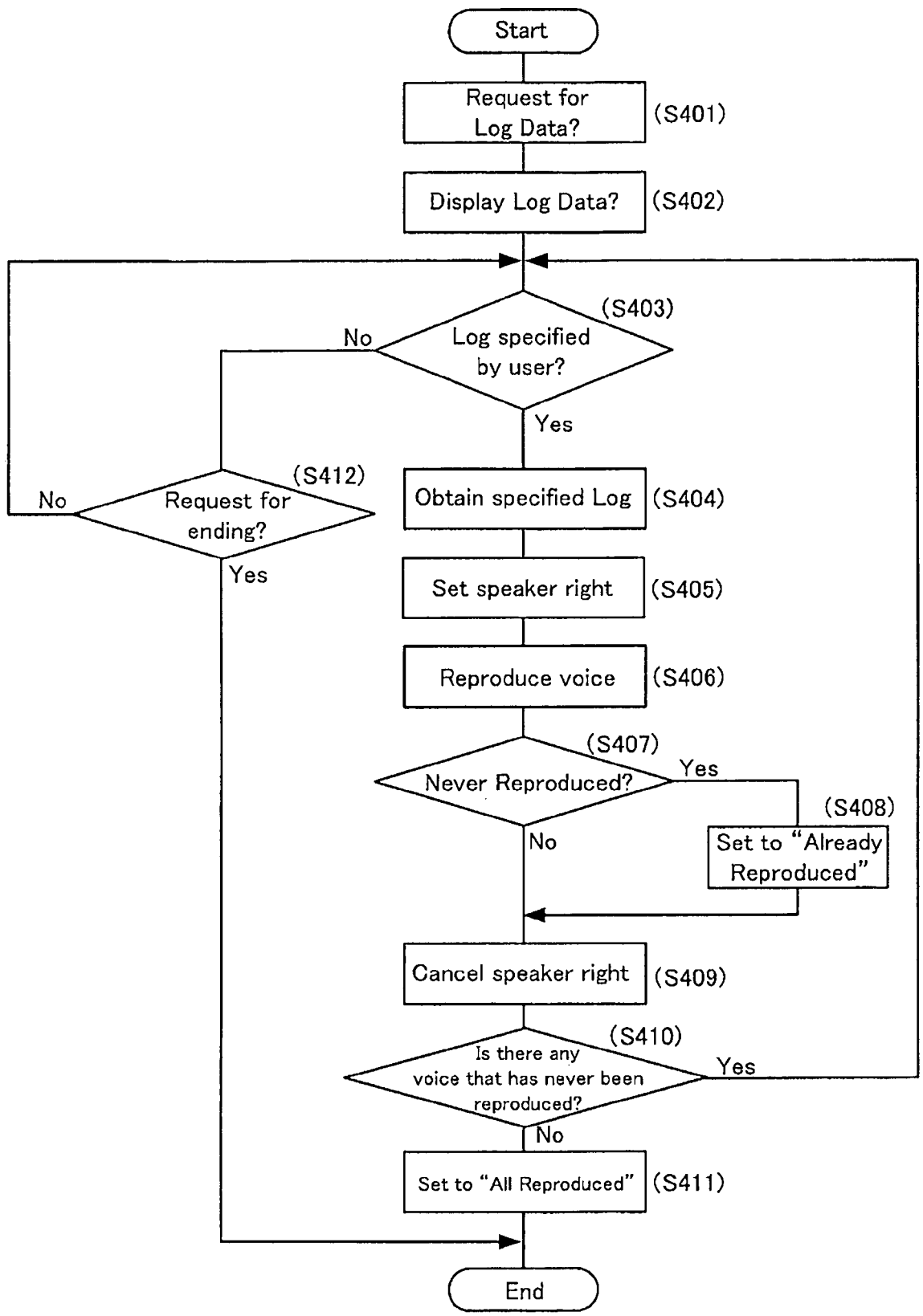
FIG. 8 is a flowchart illustrating a series of conversation log processing shown in FIG. 7.

FIG. 5 is a flowchart illustrating a flow of series of processing at the cellular phone 100_1 as a voice issuing side. FIG. 6 is a flowchart illustrating a flow of series of processing at the voice multicast server 420. FIG. 7 is a flowchart illustrating a flow of series of processing at the cellular phone 100_3 as a voice receiving side, and FIG. 8 is a flowchart illustrating a flow of conversation log processing shown in FIG. 7.

Hereinafter, a more detailed explanation will be made for the voice multicast processing by referring to these four flowcharts and FIG. 4.

Firstly, by using FIGS. 5 and 6 mainly, an explanation will be given for processing conducted at the cellular phone 100_1 as a voice issuing side and at the voice multicast server 420.

If a user of the cellular phone 100_1 presses the speaker switch 100D shown in FIG. 2, then a presence managing section 301_1 conveys staring of multicast, a member list of multicast and a request for obtaining a speaker right to the presence server 410. The presence server 410 gives a speaker right to the cellular phone 100_1, and conveys the member list participating in the voice multicast communication and information of the cellular phone possessing the speaker right to other cellular phones. A presence managing section 301_2 such as the cellular phone 100_2 conveys information transmitted from the presence server 410 to a displaying section 307_2, and the displaying section 307_2 displays on the LCD panel 101, a participant list screen that shows information about members participating in the voice multicast communication and the speaker right or the like.

Figure 9:
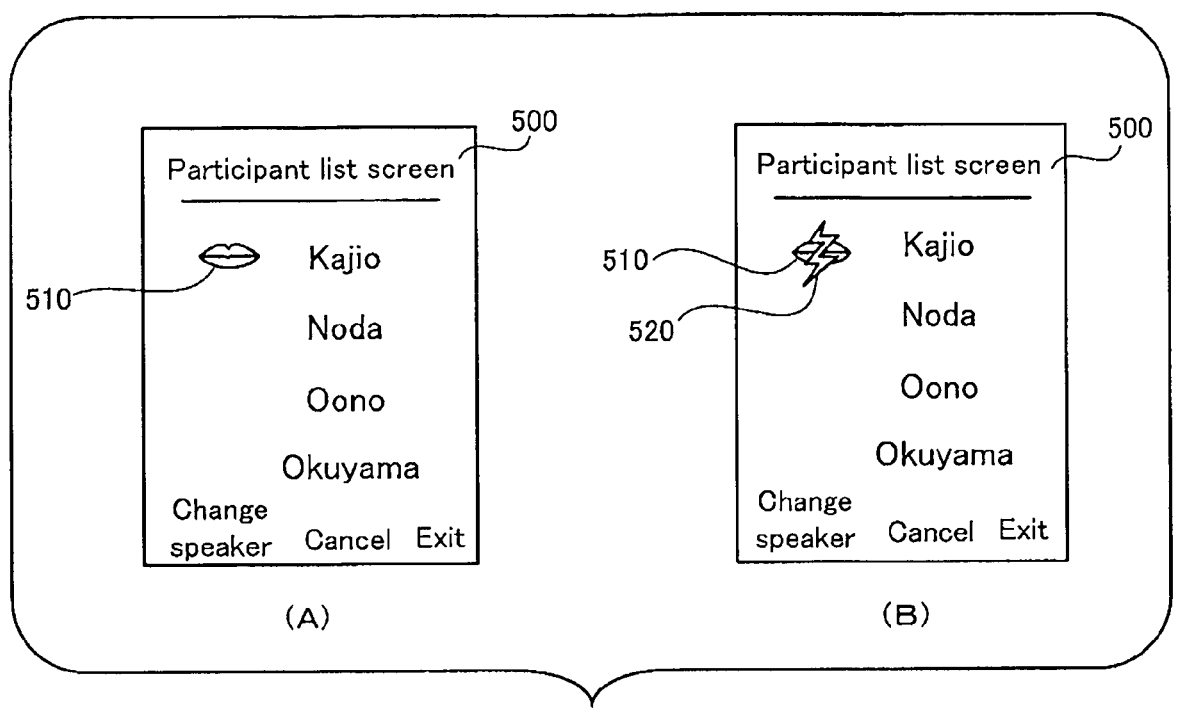
FIG. 9 is a diagram illustrating one example of participant list screens displayed on the cellular phone.

FIG. 9 is a diagram illustrating one example of participant list screens displayed on the cellular phone.

In a participant list screen 500 shown in Part (a) of FIG. 9 shows usernames of cellular phones taking part in the voice multicast communication, and a speaker mark 510 is added to the username of the cellular phone 100_1 that possesses the speaker right.

After the speaker right has been given and the user talks to the mouthpiece 102, then the voice is digitalized and audio data is generated at the microphone device 121 shown in FIG. 3 (step S101 in FIG. 5). The generated audio data is conveyed to the voice outputting section 304_1 shown in FIG. 4 and a voice number is added thereto, then issued to the voice multicast server 420 in accordance with the high-speed communication method (step S102 in FIG. 5) as well as temporarily stored in the storing section 310_1 (step S103 in FIG. 5).

Further, in the present embodiment, a conversation of a user is delimited per voice blank over a certain period of time to generate multiple audio data. For example, if the following two sentences, "Today's meeting starts at 10 o'clock." and "Please let us know as soon as possible if you cannot attend the meeting." are talked without an interval, then they are combined as one voice and one audio data is generated. If these two sentences are talked at a certain interval, then these two sentences are delimited each as a separate voice and two audio data are generated. Additionally, in the high-speed communication method, each audio data is transmitted/received in real-time, per packet that is delimited in a certain data unit at a certain timing (20 msecs). That is, in the present embodiment, if voice is entered, the voice is forwarded in a packet unit, each delimited per 20 msecs, and further, the voice is stored in the storing section 310_1. Input (step S101 in FIG. 5), issuing (step S102 in FIG. 5), and accumulation (step S103 in FIG. 5) of voice are repeated until the processing of one audio data is finished. By using the high-speed communication method, the voice can be forwarded in real-time.

At the voice receiving section 422 of the voice multicast server 420, the audio data issued from the cellular phone 100_1 is received in packet unit (step S201 in FIG. 6: Yes). At the error judging section 423, a decision is made for the received audio data whether the data is normal or abnormal. In the present embodiment, at a voice buffer where the received audio data is temporarily stored, a decision is made whether frequencies of its underflow, overflow and packet loss are within the predetermined number of times over a certain period of time, and if frequencies of the underflow, overflow and packet loss are within the predetermined number of time, the data is judged as normal (step S202 in FIG. 6: No); whereas if the underflow, overflow and packet loss occur more than the predetermined number of times, the data is judged as abnormal (step S202 in FIG. 6: Yes).

If the data is normal (step S202 in FIG. 6: No), the multicast controlling section 424 of the voice multicast server 420 sets the communication status of the cellular phone 100_1 as "normal" (step S203 in FIG. 6). The audio data which is judged normal, is transferred to the cellular phone 100_2 by the voice transferring section 421 in accordance with the high-speed communication method (step S204 in FIG. 6) and temporarily stored as well in the storing section 430 in the voice multicast server 420 (step S205 in FIG. 6).

After the processing of one audio data is completed by repeating a series of processing in which the data is received per packet unit, transferred to the cellular phone 100_2, and stored in the storing section 430 (step S206 in FIG. 6: Yes), the multicast controlling section 424 transmits ACK data indicating that the processing has completed successfully to the cellular phone 100_1 (step S207 in FIG. 6).

When the ACK data sent from the voice multicast server 420 is received at the cellular phone 100_1 as the source of issuing voice (step S104 in FIG. 5: Yes), then the audio data having been temporarily stored in the storing section 310_1 is deleted (step S105 in FIG. 5).

Furthermore, in step S202 in FIG. 6, if the audio data transmitted from the cellular phone 100_1 to the voice multicast server 420 is judged as abnormal (step S202 in FIG. 6: Yes), then the multicast controlling section 424 transmits NACK data indicating that the processing is abnormal and a voice number of the audio data to the cellular phone 100_1 (step S208 in FIG. 6), then sets the communication status of the cellular phone 100_1 as "abnormal" (step S209 in FIG. 6). The presence server 410 conveys that the communication status of the cellular phone 100_1 is "abnormal" to each of the cellular phones taking part in the voice multicast communication.

As shown in Part (b) of FIG. 9, on the LCD panel 101 of each cellular phone, the speaker right mark 510 is added to the username of the cellular phone 100_1 possessing the speaker right, and further, an abnormal mark 520 indicating an "abnormal" communication status is added. In this way, by displaying the communication status of the cellular phone 100_1 that possesses the speaker right, each cellular phone user can recognize that voice may not be issued, and thus it is possible to prevent loss of conversation.

At the cellular phone 100_1 as the source of issuing voice, when the NACK data and the voice number are received from the voice multicast server 420 (step S106 in FIG. 5: Yes), or when timeout occurs, the highly reliable communicating section 308_1 obtains the audio data with a specified voice number from audio data that have been temporarily stored in the storing section 310_1, and retransmits in accordance with the highly reliable communication method (step S107 in FIG. 5: Yes). In this way, by previously storing audio data, it is possible to save the labor of repeating talks even if error occurs. In addition, at the time of retransmission of the audio data, transmission in the highly reliable communication method that values certainty in communication over speed in communication enables ensured transmission of the voice.

The audio data retransmitted from the cellular phone 100_1 is received at the highly reliable communicating section 425 of the voice multicast server 420 (step S210 in FIG. 6), and transferred to the cellular phone 100_2 by the voice transferring section 421 in accordance with the high-speed communication method (step S211 in FIG. 6), and also temporarily stored in the storing section 430 in the voice multicast server 420 (step S212 in FIG. 6).

As described above, at the voice multicast server 420, the audio data originated from the cellular phone 100_1 is received per packet unit. After reception of one audio data is completed, at the voice multicast server 420, the audio data is stored as a log in the storing section 430, separately from the data in packet unit that have been temporarily stored. In addition, at the multicast controlling section 424 of the voice multicast server 420, a log list is generated in which the audio data stored in the storing section 430 is associated with a reproduction status of each audio data at each cellular phone, and the generated log list is also stored in the storing section 430 together with the audio data.

Next, by using FIGS. 6, 7 and 8 mainly, an explanation will be made about the processing executed in the cellular phone 100_1 as a voice receiving side and the voice multicast server 420.

At the cellular phone 100_2, the audio data transferred from the voice multicast server 420 in packet unit is received at a voice inputting section 302_2 (step S301 in FIG. 7: Yes).

At an error detecting section 305_2, error judging processing similar to the step S202 in FIG. 6 is executed for the received audio data (step S302 in FIG. 7). The audio data judged as normal (step S302 in FIG. 7: No) is once stored in a storing section 310_2, then conveyed to a reproduction section 303_2 and the voice is reproduced sequentially at the reproduction section 303_2 (step S303 in FIG. 7).

After the processing of one audio data is completed by repeating a series of processing in which data is received in packet unit and then the data is reproduced (step S304 in FIG. 7: Yes), ACK data indicating normal processing is sent from a multicast controlling section 306_2 to the voice multicast server 420 (step S305 in FIG. 7).

Furthermore, if the ACK data is sent from the cellular phone 100_2 (step S213 in FIG. 6: Yes), the voice multicast server 420 deletes the audio data that have been temporarily stored in packet unit in the storing section 430 (step S214 in FIG. 6) as well as sets the reproducing status of the audio data at the cellular phone 100_2 as "reproduction is done" in the log list that has been stored in the storing section 430 together with the log of the audio data.

Moreover, in step S302 in FIG. 7, if the audio data transferred from the voice multicast server 420 is judged as abnormal (step S302 in FIG. 7: Yes), then NACK data indicating abnormal processing and a voice number of the audio data are sent from a multicast controlling section 306_2 to the voice multicast server 420 (step S306 in FIG. 7). At the voice multicast server 420, when the NACK data is received from the cellular phone 100_2 or timeout occurs without receiving ACK data or NACK data for a certain period of time (step S213 in FIG. 6: No), then the communication status of the cellular phone 100_2 is set to "abnormal" (step S215 in FIG. 6). The presence server 410 conveys the "abnormal" communication status of the cellular phone 100_2 for each of the cellular phones participating in the voice multicast communication.

Figure 10:
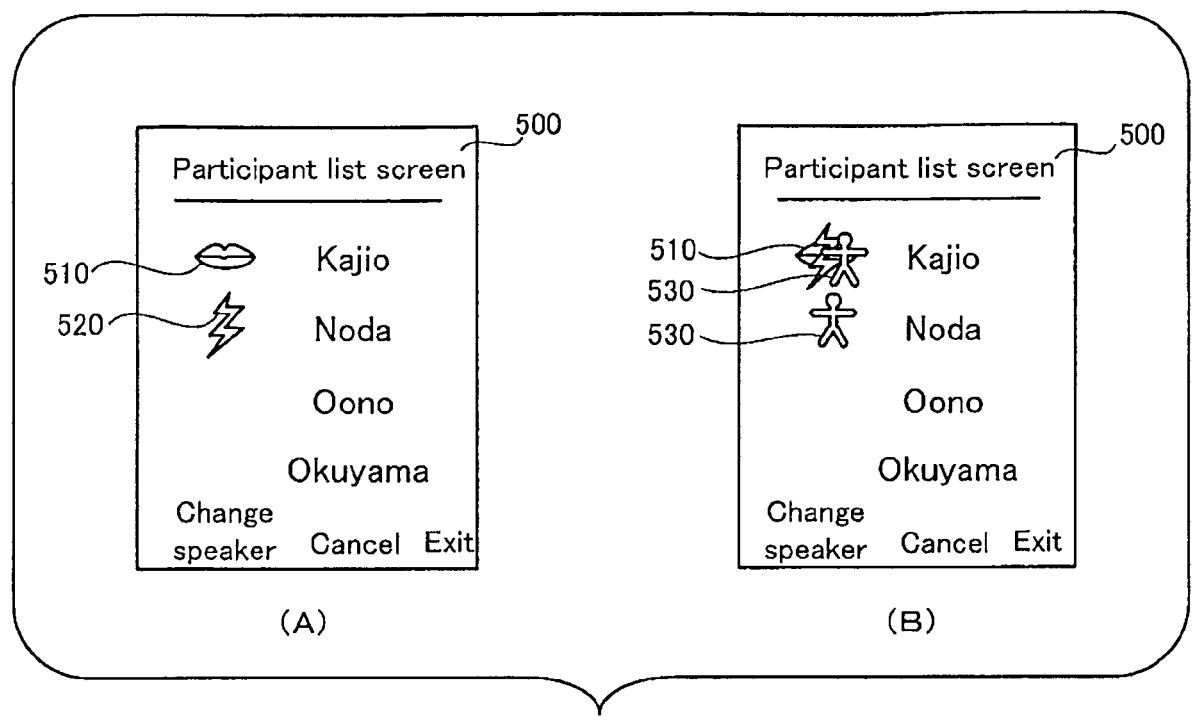
FIG. 10 is a diagram illustrating one example of participant list screens when a communication status of the cellular phone is abnormal.

FIG. 10 is a diagram illustrating one example of participant list screens when the communication status of the cellular phone 100_2 is abnormal.

As shown in Part (a) of FIG. 10, if it is notified that the communication status of the cellular phone 100_2 is abnormal, the abnormal mark 520 indicating that the communication status is "abnormal" is added to the username of the cellular phone 100_2 in the participant list screen 500.

The highly reliable communicating section 425 of the voice multicast server 420 retransfers the audio data in packet unit that have been temporarily stored in the storing section 430 to the cellular phone 100_2 in accordance with the highly reliable communication method that has higher reliability than the high-speed communication method adopted in the voice transferring section 421 (step S216 in FIG. 6). Additionally, while the audio data is being retransferred, even if a request for obtaining a speaker right is sent from each cellular phone to the presence server 401, the speaker right is maintained without conducting a transition of the speaker right.

At the cellular phone 100_2, the retransferred audio data is received at a highly reliable communicating section 308_2 (step S307 in FIG. 7).

In addition, as shown in Part (b) of FIG. 10, while the audio data is being retransferred from the voice multicast server 420 to the cellular phone 100_2, an alternative communicating mark 530 is added to the username of the cellular phone 100_1 as the source of originating the audio data, and the alternative communicating mark 530 is also added to the username of the cellular phone 100_2 that receives the audio data.

At the cellular phone 100_2, the audio data is once stored in a storing section 310_2, then the voice is reproduced (step S308 in FIG. 7) and also a request for releasing the abnormal communication status and ACK data are sent to the voice multicast server 420 (step S309 in FIG. 7).

In this way, by temporarily storing the audio data in packet unit in the voice multicast server 420, even if abnormality occurs in the audio data received at the cellular phone 100_2 side, it is possible to save the labor of obtaining the voice again from the cellular phone 100_1 as the originating source, and thus high-speed processing can be realized.

Here, as described above, the audio data transferred to the cellular phone 100_2 is reproduced after once having been stored in the storing section 310_2. Therefore, fluctuation in delay of voice has been absorbed. In addition, in the storing section 430 of the voice multicast server 420, a list of audio data issued from each of the cellular phones is stored.

For example, if the user of the cellular phone 100_2 gives an instruction to display a log list of the audio data by pressing the push button 105 or the like (step S310 in FIG. 7), then conversation log processing shown in FIG. 8 is executed and a request for obtaining the log list is conveyed from a multicast controlling section 306_2 to the voice multicast server 420 (step S401 in FIG. 8).

At the voice multicast server 420, when the request for obtaining the log list is conveyed (step S219 in FIG. 6: Yes), then the log list stored in the storing section 430 is transmitted to the cellular phone 100_2 (step S220 in FIG. 6).

At the cellular phone 100_2, the obtained log list is conveyed to a display section 307_2 and the log list is displayed on the LCD panel 101 (step S402 in FIG. 8).

Figure 11:
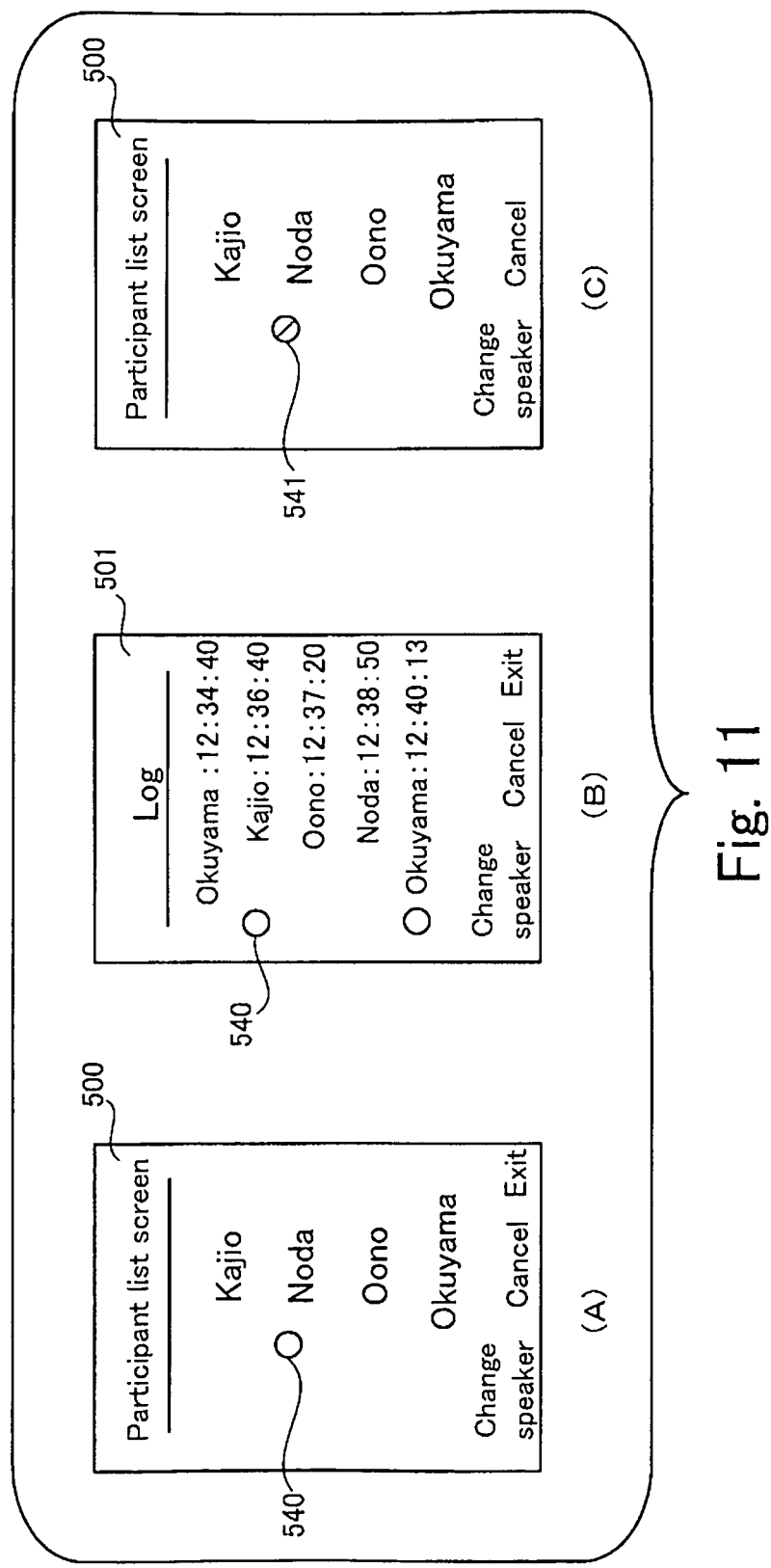
FIG. 11 is a diagram illustrating one example of participant list screens and a log list displayed on the cellular phone.

FIG. 11 is a diagram illustrating one example of the participant list screen and the log list displayed on the cellular phone 100_2.

If there is audio data that has never been reproduced, then as shown in Part (a) of FIG. 11, in the participant list screen 500, a reproduction instruction mark 540 is added to the username whose audio data has not been reproduced yet at the cellular phone 100_2. With this condition, if a user of each cellular phone selects the reproduction instruction mark 540, then a log list 501 of reproduction data like the one shown in Part (b) of FIG. 11 is displayed. In the log list 501, usernames of cellular phones that have respectively issued audio data and issuing time are displayed. Further, the reproduction instruction mark 540 is added to the audio data that has not been reproduced yet.

For example, if the user of the cellular phone 100_2 specifies a desired audio data in the log list 501 shown in Part (b) of FIG. 11 (step S403 in FIG. 8: Yes), then the specified content is conveyed to the voice multicast server 420.

At the voice multicast server 420, if a specification of the log is received (step S221 in FIG. 6: Yes), then the specified audio data is obtained among the audio data having been stored in the storing section 430 as a log, and the audio data is transmitted from the highly reliable communicating section 425 to the cellular phone 100_2 (step S222 in FIG. 6).

At the cellular phone 100_2, when the audio data specified by the user is received (step S404 in FIG. 8), a request for issuing a tentative speaker right is conveyed from a presence managing section 301_2 to the presence server 410 (step S405 in FIG. 8). If the request for issuing the tentative speaker right is conveyed, the presence server 410 sets to a state of tentative speaker right in which a request for speaker right sent from all of the cellular terminals is rejected.

At the cellular phone 100_2, the received audio data is conveyed to a reproduction section 303_2 and the voice is reproduced at the reproduction section 303_2 (step S406 in FIG. 8).

In addition, if the reproduced audio data is audio data that has never been reproduced before (step S407 in FIG. 8: Yes), its reproducing status of "already reproduced" is conveyed to the voice multicast server 420 (step S408 in FIG. 8), and the voice multicast server 420 sets the reproducing status of the audio data, which has already been transmitted to the cellular phone 100_2 and reproduced thereat, to "already reproduced" in the log list (step S223 in FIG. 6).

In addition, while the audio data that has never been reproduced yet is reproduced, as shown in Part (c) of FIG. 11, a reproduction mark 541 indicating that the voice is being reproduced is added to the username of the cellular phone that is reproducing the voice that has not been reproduced.

At the cellular phone 100_2, if reproduction of the audio data is finished, a release of the tentative speaker right state is conveyed from the presence managing section 301_2 to the presence server 410 (step S409 in FIG. 8). The presence server 410 releases the state of tentative speaker right and gives a speaker right to a cellular terminal equipment that has sent out a request for the speaker right.

In this way, by not giving a speaker right to any cellular phones while reproducing the voice that has never been reproduced before, it is possible to avoid a problem that some users cannot keep up with conversation due to accumulation of the voice that has not been reproduced yet.

If all the audio data that has never been reproduced before is reproduced (step S410 in FIG. 8: No), a request for setting the reproducing status to "all is reproduced" is conveyed from the multicast controlling section 306_2 of the cellular phone 100_2 to the voice multicast server 420 (step S411 in FIG. 8).

At the voice multicast server 420, if an instruction for setting a reproducing status is conveyed thereto (step S217 in FIG. 6: Yes), then the reproducing status of all the audio data at the cellular phone 100_2, written in the log list stored in the storing section 430 is set to "already reproduced" (step S218 in FIG. 6).

In this way, according to the present embodiment, it is possible to reduce repeated talks and lack of topics, and voice can be reproduced in real-time among multiple cellular phones.

Here, in the above description, the explanation has been made about the voice multicast system composed of multiple cellular phones and a server equipment. However, a terminal equipment according to the present invention may be, for example, a terminal equipment for a video phone.

Also, in the above description, the explanation has been made about the example in which each communication status of multiple cellular phones is displayed. However, the communication status notifying section according to the present invention may notify the users of a communication status through voice and so on.

Also in the above description, the explanation has been made about the example in which ACK data or NACK data is transmitted or received per each audio data that is delimited per blank of voice over a certain period of time, the ACK data or the NACK data may be, for example, transmitted or received each time a speaker right is switched.

What is claimed is:

1. A communication system that includes a plurality of terminal equipments and a server equipment, the communication system transmits audio data representing voice from one of the plurality of the terminal equipments, transfers the audio data to other terminal equipments at the server equipment and reproduces the voice in real-time at the other terminal equipments, the server equipment comprising:
an audio data receiving section that receives audio data transmitted from the terminal equipments;
an audio data transfer section that transfers, using a first communication mode, the audio data received at the audio data receiving section to each of the other terminal equipments excepting an originating terminal equipment that has originated the audio data;
a communication status receiving section that receives communication status data indicating whether or not the transferred audio data has been received normally, from each of the terminal equipments to which the audio data has been transferred;
an audio data retransmitting section that retransfers the audio data if the communication status data indicates that the audio data which has been transferred has not been received normally, wherein the audio data retransmitting section uses a second communication mode in the retransfer, the second communication mode being relatively slow in communication speed and relatively superior in reliability of communication compared with the first communication mode;
a communication status judging section that judges whether or not the audio data received at the audio data receiving section has been received normally;
a communication status data transmitting section that transmits communication status data indicating a result of judgment made at the communication status judging section to each of the plurality of terminal equipments; and a transmission inhibiting section which inhibits transmission of the audio data from the terminal equipments until the retransfer by the audio data retransmitting section is completed, each of the terminal equipments comprising:

an audio data transmitting section that transmits the audio data to the server equipment using the first communication mode;

a transferred audio data receiving section that receives audio data transferred from the server equipment;

a communication status judging section that judges whether or not the audio data received at the transferred audio data receiving section has been received normally;

a response data transmitting section that transmits the communication status data indicating a result of judgment made at the communication status judging section to the server equipment;

a communication status data receiving section that receives the communication status data transmitted from the server equipment;

an audio data retransmitting section that retransmits, using the second communication mode, the audio data to the server equipment if the received communication status data indicates the transmitted audio data has not been received normally by the server equipment;

a communication status notifying section which notifies a user that the terminal equipment is in a status of retransmission until the retransmission by the audio data retransmitting section is completed; and an audio reproduction section that reproduces voice represented by the audio data received at the transferred audio data receiving section.

2. The communication system according to claim 1, wherein the response data transmitting section of each of the terminal equipments notifies the server equipment of a response data indicating that the receiving state of the audio data is abnormal as the communication status data, if a judgment is made at the communication status judging section that the audio data received at the transferred audio data receiving section has not been received normally.

3. The communication system according to claim 1, wherein the server equipment further comprises a received data storing section that stores audio data received at the audio data receiving section, and if at the communication status receiving section, the first communication status data received from a terminal equipment among the plurality of terminal equipments excepting the originating terminal equipment indicates a bad receiving state of the audio data, the audio data retransmitting section retransfers the audio data stored in the received data storing section to the terminal equipment.

4. The communication system according to claim 1, wherein the audio data is a series of delimited data that is delimited per certain timing, and each of the terminal equipments further comprises:

a list receiving section that receives a list of the delimited data;

a list displaying section that displays the list of the delimited data received at the list receiving section; and an audio data designating section that designates one delimited data in the list displayed at the list displaying section according to an operation, and the server equipment further comprises:

a received data storing section that stores the audio data received at the audio data receiving section, for each of the delimited data;

a list transmitting section that transmits a list of the delimited data stored in the received data storing section; and a retransfer conducting section that retransfers the designated delimited data, upon receipt of designation of one delimited data in the list.

5. The communication system according to claim 1, wherein each of the terminal equipments further comprises a reproducing status notifying section that notifies the server equipment of a reproducing status of the audio data, and the server equipment further comprises a second communication status judging section which judges that communication status is bad for a terminal equipment, of the plurality of terminal equipments, which has notified that the reproducing is not completed and a terminal equipment, of the plurality of terminal equipments, which has not notified the reproducing status.

6. The communication system according to claim 1, wherein the response data transmitting section of each of the terminal equipments repeatedly transmits, as the communication status data, response data to the server equipment indicating that the receiving state of the audio data is normal.

7. A terminal equipment used in a communication system that includes a plurality of terminal equipments and a server equipment, the communication system transmits audio data representing voice from one of the plurality of terminal equipments, transfers the audio data to other terminal equipments at the server equipment, and reproduces the voice in real-time at the other terminal equipments, the terminal equipment comprising:

an audio data transmitting section that transmits audio data representing voice to the server equipment using a first communication mode;

a transferred audio data receiving section that receives audio data that has been originated from other terminal equipments and transferred from the server equipment;

a communication status judging section that judges whether or not the audio data received at the transferred audio data receiving section has been received normally;

a response data transmitting section that transmits communication status data indicating a result of judgment made at the communication status judging section;

a communication status receiving section that receives communication status data from the server equipment indicating whether or not the transmitted audio data has been received normally by the server equipment;

an audio data retransmitting section that retransmits the audio data to the server equipment if the received communication status data indicates that the audio data has not been received normally by the server equipment, wherein the audio data retransmitting section uses a second communication mode in the retransmission, the second communication mode being relatively slow in communication speed and relatively superior in reliability of communication compared with the first communication mode;

a communication status notifying section that notifies a user that the terminal equipment is in a status of retransmission until the retransmission by the audio data retransmitting section is completed; and an audio reproduction section that reproduces voice represented by audio data received at the transferred audio data receiving section.

8. A server equipment used in a communication system that includes a plurality of terminal equipments and a server equipment, the communication system transmits audio data representing voice from one of the plurality of terminal equipments, transfers the audio data to other terminal equipments at the server equipment, and reproduces the voice in real-time at the other terminal equipments,
the server equipment comprising:
an audio data receiving section that receives audio data transmitted from the terminal equipments;
an audio data transfer section that transfers, using a first communication mode, the audio data received at the audio data receiving section to each of the other terminal equipments excepting an originating terminal equipment that has originated the audio data;
a communication status receiving section that receives communication status data indicating whether or not the transferred audio data has been received normally, from each of the terminal equipments to which the audio data has been transferred;
an audio data retransmitting section that retransfers the audio data if the communication status data indicates that the audio data which has been transferred has not been received normally, wherein the audio data retransmitting section uses a second communication mode in the retransfer, the second communication mode being relatively slow in communication speed and relatively superior in reliability of communication compared with the first communication mode;
a communication status judging section that judges whether or not the audio data received at the audio data receiving section has been received normally;
a communication status data transmitting section that transmits communication status data indicating a result of judgment made at the communication status judging section to each of the plurality of terminal equipments; and
a transmission inhibiting section that inhibits transmission of the audio data from the terminal equipment until the retransmission by the audio data retransmitting section is completed.

* * * * *